United States Patent [19]

Simpson et al.

[11] Patent Number: 4,473,297

[45] Date of Patent: Sep. 25, 1984

[54] RING LASER GYROSCOPE UTILIZING PHASE DETECTOR FOR MINIMIZING BEAM LOCK-IN

[75] Inventors: James H. Simpson, Katonah, N.Y.; James G. Koper, Wayne, N.J.

[73] Assignee: The Singer Company, Little Falls, N.J.

[21] Appl. No.: 320,647

[22] Filed: Nov. 12, 1981

[51] Int. Cl.³ .............................................. G01C 19/64
[52] U.S. Cl. .................................................. 356/350
[58] Field of Search ........................................ 356/350

[56] References Cited

U.S. PATENT DOCUMENTS 3,697,181 10/1972 Macek et al. ........................ 356/350
4,152,071 5/1979 Podgorski ............................ 356/350

Primary Examiner—Vincent P. McGraw
Attorney, Agent, or Firm—Morris Liss; T. W. Kennedy

[57] ABSTRACT

Two of the three reflecting mirrors in a ring laser gyroscope are provided with transducers permitting the mirrors to control the ring laser gyroscope laser path. The third mirror is partially reflecting to permit some cavity radiation to exit. The radiation includes winking signal components which are related to laser beam lock-in. By controlling the phase difference between the signal components, minimum lock-in may be achieved.

6 Claims, 1 Drawing Figure

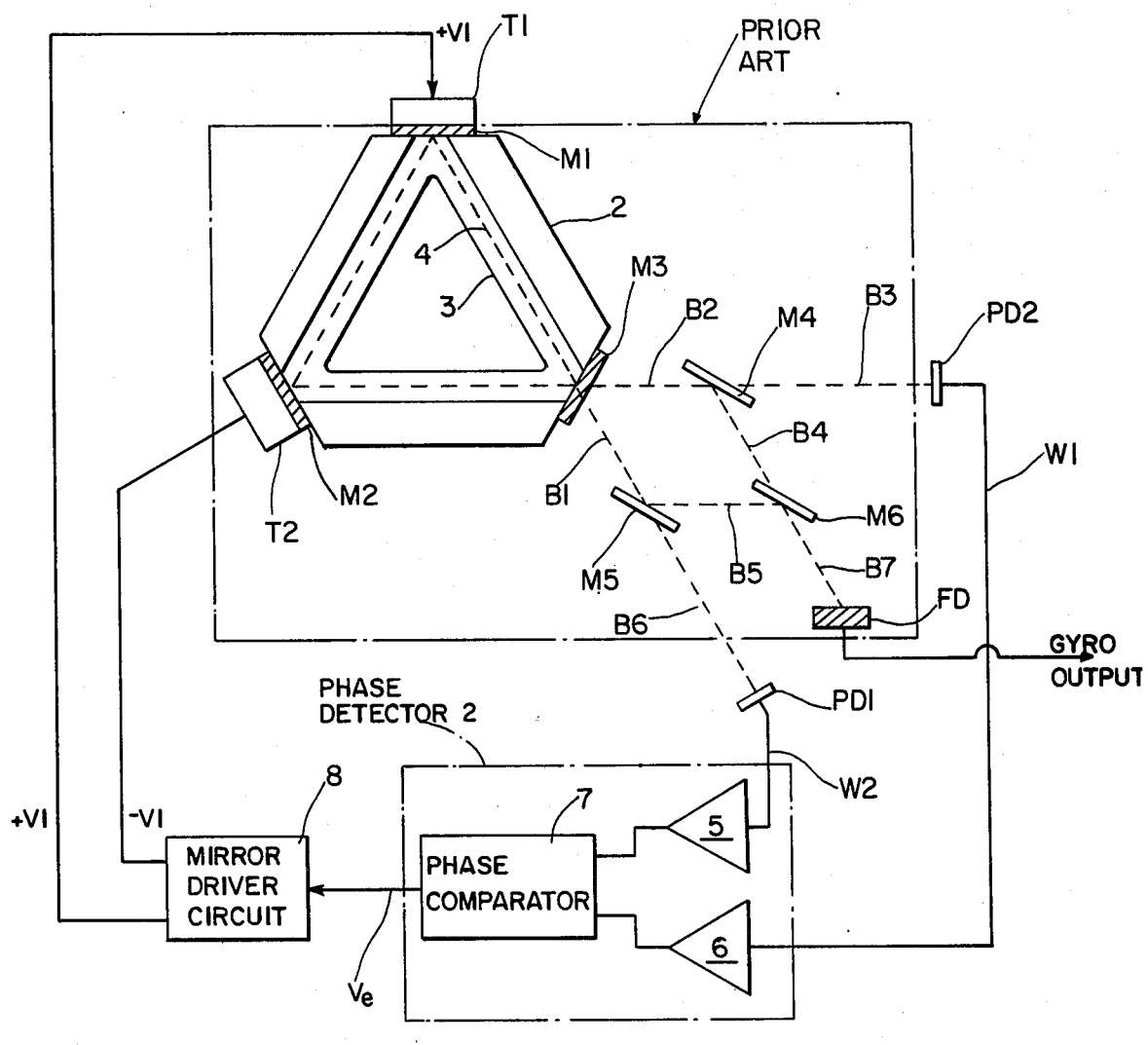

RING LASER GYROSCOPE UTILIZING PHASE DETECTOR FOR MINIMIZING BEAM LOCK-IN

FIELD OF THE INVENTION

The present invention relates to ring laser gyroscopes and more particularly to a method and structure for minimizing beam lock-in.

BACKGROUND OF THE INVENTION

The performance of a ring laser gyroscope (RLG) is related to the lock-in band. This is a region of angular rate input around zero input rate in which the two oppositely directed traveling waves (ODTW) are synchronously locked due to mutual coupling therebetween. No conventional RLG output is obtained while the lock-in band and the scale becomes highly nonlinear as the lock-in band is approached. In one class of RLG a periodical varying bias (dither) is imposed on the RLG in order to minimize the effects of the lock-in region. Greater specifics are disclosed in U.S. Pat. No. 4,132,482, assigned to the present assignee. Although the patented approach operates generally satisfactorily, there are still nonlinearities in the scale factor and a random walk coefficient that are a function of the lock-in bandwidth.

In current RLG instrumentation a servo is employed to minimize a detectable signal known as the winking signal in order to reduce the lock-in band. However, it has been observed that in the case of some RLGs the lock-in is a minimum when the winking signal is a maximum. In others, the minimum lock-in bandwidth is found somewhere between minimum and maximum winking signals. The winking signals are ac modulation of the intensities of the laser beams that can be observed both within and outside of the lock-in bandwidth. Both the cw and ccw waves in the RLG exhibit the winking signals. This phenomenon arises from the backscatter that causes the coupling between two beams and results in the locking of two oscillators.

The relative phase between the winking signals can be readily observed in the laboratory by forming a Lissajou pattern with the two winking signals. This has been done and in general when the phase difference between the two winking signals is 180 degrees, the lock-in is minimized regardless of the winking signal amplitude. Investigation of the theory of RLGs tending to support this argument is presented hereinafter.

In most RLG instrumentation, the output is the phase difference between the optical oscillations of the two waves as observed in interference between the two waves. This is usually referred to as the "fringe pattern" and is to be retained. However, it is proposed that the device allowing the fringe pattern to be formed also provides for the observation of the individual intensities of the two beams.

BRIEF DESCRIPTION OF THE PRESENT INVENTION

The present invention is directed to a novel means and method for reducing lock-in. This is achieved by measuring the relative phase of winking signals of the laser beams and controlling the phase difference to be 180 degrees which results in minimized lock-in.

The result of the invention is to control the RLG laser path position in order to maintain operating conditions at an optimal value through a comparison of the phase difference between the winking signals.

The above-mentioned objects and advantages of the present invention will be more clearly understood when considered in conjunction with the accompanying drawing, in which:

BRIEF DESCRIPTION OF THE FIGURE

The FIGURE illustrates a ring laser gyroscope incorporating the phase adjusting means of the invention.

DETAILED DESCRIPTION OF THE INVENTION

The FIGURE illustrates a ring laser gyroscope which comprises a triangular block 2 exhibiting low thermal expansion. A cavity 3 is formed in the block which is defined by three reflecting corner mirrors M1, M2, and M3. Electrodes (not shown) cause gas within the cavity to form clockwise and counterclockwise monochromatic light beams, collectively indicated by reference numberal 4, due to plasma discharge. Mirrors M1 and M2 are designed to be flexible and can be moved along a direction perpendicular to their surface by conventional piezoelectric transducers T1 and T2. The indicated applied voltages drive the piezoelectric transducers. Such a transducer is disclosed in U.S. Pat. No. 3,581,227 issued May 25, 1971.

The mirror M3 permits a small amount of the radiation in the cavity to exit. These are shown as beams B1 and B2 which strike the partial reflecting mirrors M5 and M4 respectively. The partially reflecting mirrors M4 and M5 split each beam into two components, one divided toward a respective photodiode (PD2, PD1), the other towards a beam combiner M6. The beam labeled B2 is split into beams B3 and B4, while beam B1 is split into beams B5 and B6. Beams B4 and B5 are combined at combiner M6 to form a nearly colinear beam B7 that strikes the fringe detector FD which forms the gyro output.

The principal point of this invention concerns the use of signals from beams B3, and B6 as detected by photodetector PD1 and PD2. The intensities of these beams are made up of a dc part and an ac part, the latter comprising the winking signals. At a constant RLG rotation rate these ac signals oscillate in time at a frequency proportional to the rotation rate. For low backscatter amplitudes the oscillations are approximately pure sinusoids. In general there is an arbitrary phase between the phases of the signals from photodetectors PD2 and PD1 (signals W1 and W2). This phase can be changed by moving the mirrors M1 and M2 synchronously so that the path length of the laser cavity remains constant but the position of the beam on the mirrors changes.

The preferred phase difference for minimum lock-in is 180 degrees. Therefore, the control for the mirrors is set by means of the phase detectors. The detector typically includes preamplifiers 6 and 5 for respective signals W1 and W2, the outputs of the amplifiers driving phase comparator 7 which compares the phase of signals W1 and W2 generate an output error signal Ve that is zero when the phase difference between W1 and W2 is 180 degrees. These error signals will actuate the mirror driver circuit 8 such that the mirrors M1 and M2 move to reduce the error signal toward zero.

The beam combining means formed by mirrors M4, M5 and M6 and photodetectors PD1 and PD2 is different from those previously used in that it provides access to both winking signals. However, it is not the only way for obtaining both winking signals. Rather than using separate mirrors, a combination of mirrors and prisms could be used. Fiber optics could also be used. If the optical signals were conducted from mirror M3 toward the beam combining means, optical couplers could split a small fraction of the signals from each beam and bring them toward separate photodiodes. The signals may also be obtained through mirrors M1 or M2 by use of photodetectors appropriately located in these mirror structures.

The following considers the supporting theory of the invention. The intensity of the two beams in an RLG and their phase difference is described by a system of three simultaneous, coupled differential equations as disclosed in the publications: F. Aronowitz and R. J. Collins, *J. of Applied Phys.* 41, 130 (1970) and Yu. L. Klominontovich, et al., *Soviet Phys.* JETP 24, 1 (1967). A coupling between the two waves is due to backscattering of light from one beam to the other. This backscattering takes place mostly at the surface of the mirrors. The total scattering from the three mirrors is described as a single amplitude and phase shift for each beam. It can be shown that the phase shifts of the backscattering affect the lock-in as the average phase shift, $$\epsilon = \tfrac{1}{2}(\epsilon_1 + \epsilon_2),$$

where $\epsilon_1$ and $\epsilon_2$ are the optical phase shifts due to scattering of the first beam into the second beam and the second beam into the first beam, respectively.

The lock-in band for the gyro is a function of $\epsilon$ and other variables including the backscatter amplitude. The theory shows that the lock-in decreases as $\epsilon$ approaches 90 degrees.

In recent RLG computer simulations, it has been demonstrated that as $\epsilon$ approaches 90 degrees the phase difference between the winking signals approaches 180 degrees. No other parameters that have been tested in the simulation affect the winking signal phase difference. Therefore, the phase between the winking signals should provide a measure of $\epsilon$, the average backscatter phase shift and hence the winking signal phase can be used to adjust the lock-in to a minimum value.

Accordingly, by comparing the phase difference between the winking signals, the RLG laser path may be adjusted to minimize beam lock-in.

It is noted that the concept of the present invention may be employed in dithered and non-dithered gyros. Further, although the discussion is directed to a preferred embodiment employing three mirrors in a triangular housing, the invention may operate in a suitably shaped housing where more than three mirrors are mounted.

It should be understood that the invention is not limited to the exact details of construction shown and described herein for obvious modifications will occur to persons skilled in the art.

We claim:

1. In a ring laser gyroscope having a cavity wherein two laser beams circulate in opposite directions, a system for minimizing beam lock-in comprising:
   at least three reflecting corner mirrors bounding the cavity;
   first photodetecting means for detecting a winking signal of a first beam;
   second photodetecting means for detecting a winking signal of a second beam;
   means connected in circuit to the outputs of the first and second photodetecting means for detecting the phase therebetween and generating an error signal as a function of the phase;
   first and second transducer means respectively connected to first and second corner mirrors for individually moving the mirrors thereby effecting a change in laser beam position; relative to the mirrors; and
   mirror driving means connected at its input to the error signal and at its outputs to the first and second transducer means for simultaneously adjusting the first and second mirrors, and thereby the beam position, relative to the mirrors, for minimizing beam lock-in;
   wherein the beam lock-in is minimized when the winking signals are out of phase by 180 degrees.

2. The structure set forth in claim 1 wherein the phase detecting means comprises:
   first and second means for amplifying the detected winking signals; and
   a phase comparator connected at its inputs to the output of the amplifying means, the error signal appearing at the output of the phase comparator.

3. A ring laser gyroscope which minimizes beam lock-in, the gyroscope comprising:
   a housing having a cavity therein through which first and second beams pass in opposite directions;
   a stationary mirror mounted to a first corner of the housing and permitting partial radiation of the beams to exit therefrom;
   first and second movable mirrors mounted to the second and third corners of the housing for adjusting the position of the beam within the cavity;
   first and second means for splitting the exiting beams into respective first and second beam components;
   means for combining the first components;
   first photodetecting means for receiving the combined first components and generating data output of the ring laser gyroscope;
   second photodetecting means receiving a second component of one beam and detecting a winking signal therein;
   third photodetecting means receiving a second component of the other beam and detecting a winking signal therein;
   means connected at its inputs to the outputs of the second and third photodetecting means for detecting the phase between winking signals and generating an error signal therefrom; and
   means responding to the error signal for driving the movable mirrors simultaneously to effect minimum beam lock-in;
   wherein the beam lock-in is minimized when the winking signals are out of phase by 180 degrees.

4. The structure set forth in claim 3 wherein the first and second movable mirrors each include a transducer connected to a mirror, an input of each transducer being connected to the output of the driving means.

5. The structure set forth in claim 3 wherein the phase detecting means comprises:
   first and second means for amplifying the detected winking signals; and
   a phase comparator connected at its inputs to the output of the amplifying means, the error signal appearing at the output of the phase comparator.

6. A method for minimizing beam lock-in in a ring laser gyroscope, the method including the steps:

photodetecting the winking signal in a first ring laser gyroscope beam;
photodetecting the winking signal in a second ring laser gyroscope beam;

detecting the phase between the winking signals; and
adjusting the beam position until the detected phase between the winking signals is substantially equal to 180 degrees.

* * * * *